United States Patent [19]

Morelli

[11] Patent Number: 5,048,342
[45] Date of Patent: Sep. 17, 1991

[54] MOTOR VEHICLE CONSTRAINING APPARATUS, PARTICULARLY SUITABLE FOR VEHICLE RUNNING SIMULATION BENCHES

[75] Inventor: Alberto Morelli, Turin, Italy
[73] Assignee: Fiat Auto S.p.A., Turin, Italy
[21] Appl. No.: 412,653
[22] Filed: Sep. 26, 1989

[30] Foreign Application Priority Data

Sep. 28, 1988 [IT] Italy .................... 67869 A/88

[51] Int. Cl.$^5$ .................................. G01N 29/00
[52] U.S. Cl. .............................. 73/669; 73/117.2
[58] Field of Search ............ 73/669, 117, 117.2, 73/118.1, 865.6

[56] References Cited

U.S. PATENT DOCUMENTS

| 3,827,289 | 8/1974 | Borg | 73/71.7 |
| 3,837,221 | 9/1974 | Odier | 73/124 |
| 4,658,656 | 4/1987 | Haeg | 73/669 |
| 4,733,558 | 3/1988 | Grenier | 73/669 |
| 4,798,088 | 1/1989 | Haeg et al. | 73/669 |

Primary Examiner—Hezron E. Williams
Assistant Examiner—Louis M. Arana
Attorney, Agent, or Firm—Eckert Seamans Cherin & Mellott

[57] ABSTRACT

The apparatus comprises three rigid elements joined articulatedly together by constraint means such as to allow a first articulated element to oscillate with respect to a second element about a first substantially fixed axis of virtual oscillation, and to allow a second articulated element to oscillate with respect to the third element about a second substantially fixed axis of virtual oscillation perpendicular to the first axis; the first articulated element is arranged to be fixed rigidly to the vehicle body and the third element is arranged to be fixed to a support structure interposed between the apparatus and the apparatus base.

13 Claims, 3 Drawing Sheets

MOTOR VEHICLE CONSTRAINING APPARATUS, PARTICULARLY SUITABLE FOR VEHICLE RUNNING SIMULATION BENCHES

BACKGROUND OF THE INVENTION

This invention relates to a motor vehicle constraining apparatus for use on vehicle running simulation benches.

A bench of this type enables the vehicle running conditions to be reproduced in an environment of small dimensions comparable with the dimensions of the vehicle itself and allows the value of certain physical quantities to be measured during running. A bench of this type therefore comprises a runway on which the wheels of the vehicle rest and an apparatus to constrain this latter in such a manner as to prevent it moving forwards. For the running simulation provided by the bench to be valid, the constraining apparatus must allow some degrees of freedom of movement and manoeuvre, which although being of subsidiary order compared with the forward movement, are of fundamental importance in obtaining proper reproduction of the running behaviour. The movements which such an apparatus must allow are substantially the suspension movements (roll, pitch and translation in a direction substantially normal to the ground) and the attitude movements (lateral translation and yaw).

Currently used constraining apparatus normally comprises assemblies of flexible elements anchored in various ways to the vehicle body and passing about pulleys fixed to points somewhat distant for the body, so as to keep the direction of the constraints imposed by said elements constant even when the body moves. In other cases such constraining apparatus comprises lattice structures formed to generate a virtual constraint through the vehicle barycenter, these structures being positioned substantially laterally to the sides of the vehicle. The constraining apparatus of the aforesaid type has numerous drawbacks.

Firstly, such apparatus involves rather large masses and moments of inertia which cannot be totally ignored compared with those of the vehicle itself, thus altering the running conditions simulated by the bench and negatively influencing the measurements taken during the test. In addition, such apparatus is rather bulky and considerably reduces access to the vehicle under test. Furthermore, the operations involved in connecting the vehicle to such constraining apparatus are long and complicated and require particular care and caution.

Finally, such apparatus is not always able to provide rigorous virtual constraint of the barycenter of the vehicle and preserve all the degrees of freedom which this possesses under real operating conditions.

SUMMARY OF THE INVENTION

The object of the present invention is to provide a constraining apparatus of the aforesaid type which is free of the stated drawbacks in that it has low masses and moments of inertia compared with those of the vehicle, it allows the same access to the vehicle under normal running conditions, it enables the vehicle to be fixed to the apparatus by simple and rapid operations, and it rigorously constrains only the barycenter of the vehicle while allowing it the same degrees of freedom of movement which it possesses when under real running conditions. This object is attained by a motor vehicle constraining apparatus particularly suitable for vehicle running simulation benches, characterised by comprising three rigid elements joined articulatedly together by constraint structure such as to allow a first articulated element to oscillate with respect to a second element about a first substantially fixed axis of virtual oscillation, and to allow a second articulated element to oscillate with respect to the third element about a second substantially fixed axis of virtual oscillation perpendicular to the first axis, said first articulated element being arranged to be fixed rigidly to the vehicle body and the third element being arranged to be fixed to a support structure interposed between said apparatus and the ground.

BRIEF DESCRIPTION OF THE DRAWINGS

The apparatus of the present invention will be more apparent from the detailed description thereof given by way of example with reference to the accompanying drawings in which.

DETAILED DESCRIPTION OF THE INVENTION

Figure 1:
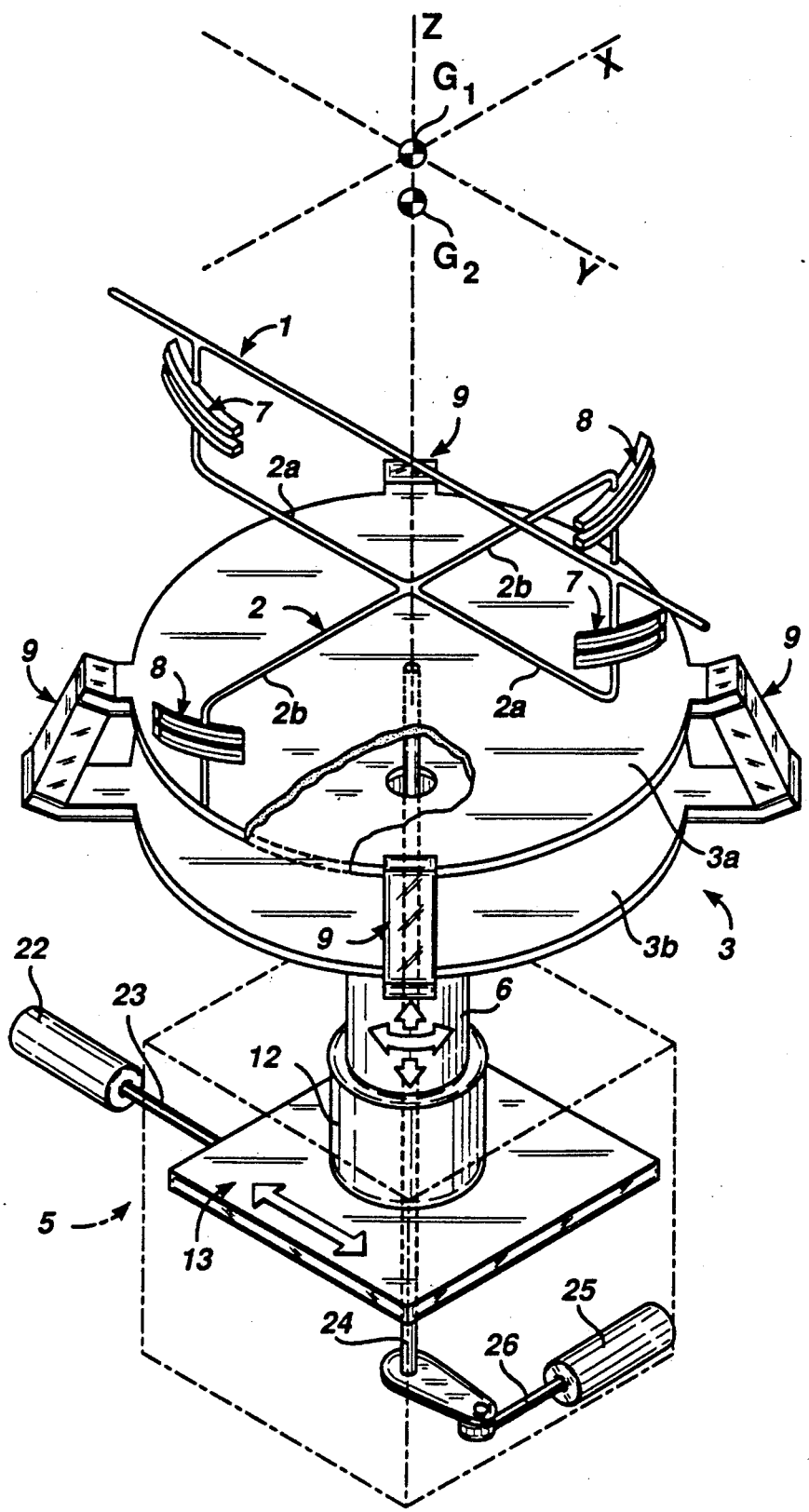
FIG. 1 is a diagrammatic representation of the elements and basic parts of the apparatus of the invention.

The constraining apparatus of the invention is for use on a motor vehicle running simulation bench, not shown in the figures, which comprises substantially a runway on which the vehicle is rested and formed for example from belts, rollers or crawler tracks. The purpose of the constraining apparatus according to the invention, shown in FIGS. 1 and 2 in which corresponding members and parts are indicated by the same reference numeral, is to prevent the vehicle from moving forward on the runway while allowing it those degrees of movement and manoeuvring freedom which pertain during vehicle running.

The apparatus comprises three rigid elements indicated by 1, 2 and 3 (FIG. 1), joined articulatedly together by constraint structure such as to allow a first articulated element 1 to oscillate with respect to a second articulated element 2 about a first substantially fixed axis of virtual oscillation (indicated by X), and to simultaneously allow the second articulated element 2 to oscillate with respect to the third element 3 about a second substantially fixed axis of virtual oscillation (indicated by Y) perpendicular to the first axis. The X and Y axes can be coplanar and intersect at the barycenter $G_1$ of the assembly formed from the vehicle and those parts of the apparatus rigid with it, or alternatively said axes can pass through the barycenter $G_1$, $G_2$ of said assembly with respect to its movement about the axes X and Y respectively.

Figure 2:
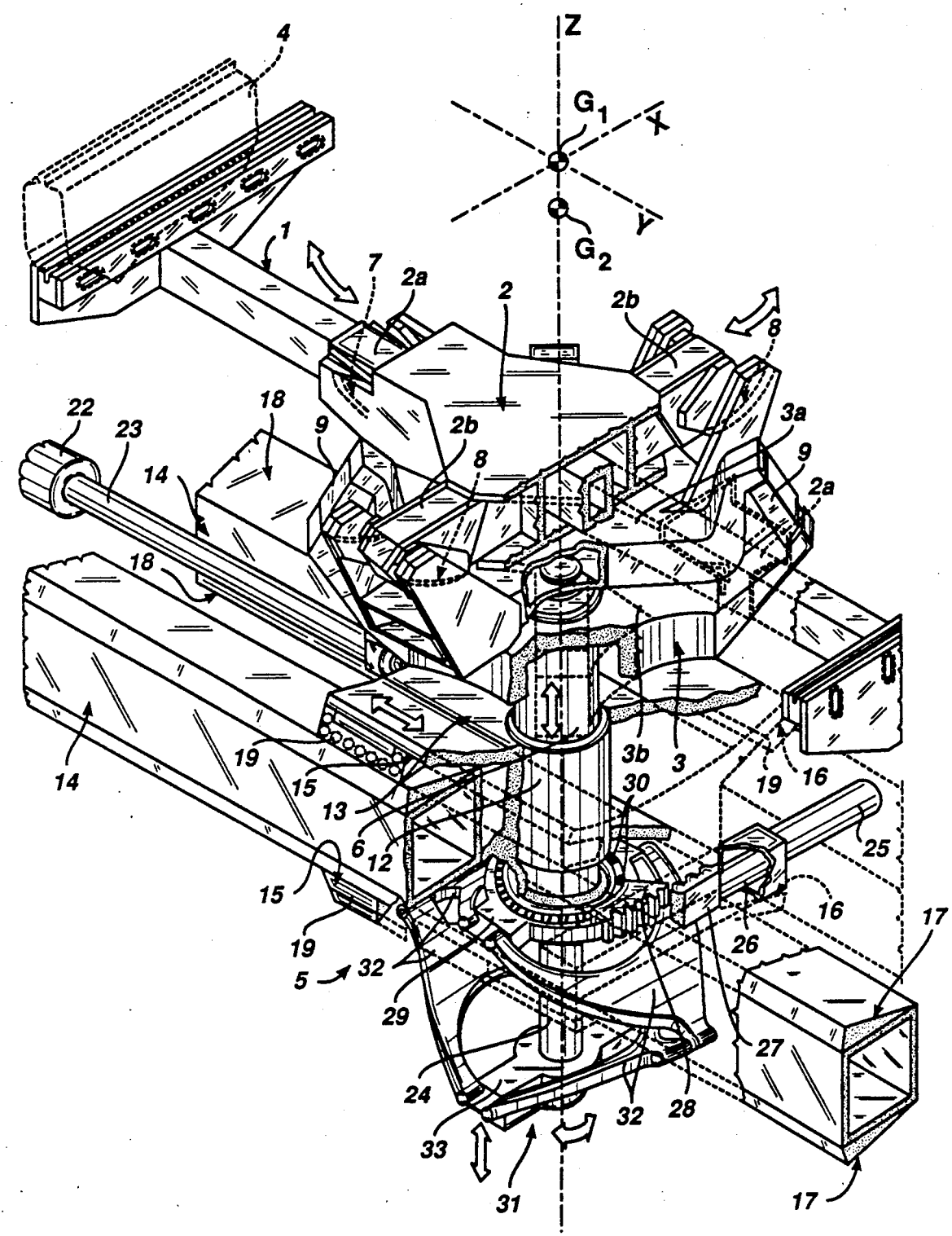
FIG. 2 is a perspective representation of one embodiment of the invention, with some parts shown in section.

The first element 1 is arranged to be fixed rigidly to the vehicle body in any convenient manner, for example to important structural elements such as the longitudinal (side) members 4 (FIG. 2). The third element 3 is arranged to be fixed to a support structure, indicated overall by 5 (FIG. 1), which is interposed between the apparatus itself and the apparatus base. In one non-illustrated embodiment of the structure according to the invention, the support structure 5 can comprise simply a rigid connection member 6 (FIG. 1) arranged to rigidly connect the articulated element 3 directly to the base.

Said constraint structure which connect together the three said articulated elements conveniently comprise a first and a second series of substantially cylindrical guides 7 and 8 interposed between the articulated element 1 and articulated element 2 and between articulated element 2 and the articulated element 3 respectively. These guides are arranged to allow relative oscillation movements about said X and Y respectively.

The third articulated element 3 comprises a pair of plates 3a, 3b between which there is disposed an assembly of dynamometer cells 9 arranged to measure the components of the forces transferred between the plates. Said assembly conveniently comprises four cells disposed such that the relative axes provide a pyramid configuration as is clearly visible in FIG. 2.

As can be clearly seen from FIG. 2 the articulated element 1 comprises substantially a beam of rectilinear axis to which the longitudinal members 4 of the vehicle body and part of the first series of guides 7 are fixed. The second articulated element 2 is substantially cross-shaped and comprises a first pair of substantially coaxial arms 2a to which parts of the first series of guides 7 are fixed, and a second pair of substantially coaxial arms 2b perpendicular to the preceding, and to which parts of the second series guides 8 are fixed. Conveniently, said guides comprise shoes with rolling body circulation (not shown). The connection element 6 of the support structure 5, the former being fixed to the third element 3, is mobile axially in the direction of a third axis Z perpendicular to said X and Y axes. In addition, said connection member 6 can rotate about the Z axis. For this purpose the connection member 6 is housed in a sleeve 12 rigid with a slide 13 mobile in the direction of the Y axis. Conveniently, a bush (not shown) comprising rolling body circulation is interposed between the member 6 and sleeve 12. The slide 13 is supported by a pair of rectilinear guides 14 (FIG. 2) having their axis parallel to the Y axis, and is provided with two pairs of tracks 15, 16 arranged to cooperate with corresponding tracks 17 and 18 on said guides, as can be clearly seen in FIG. 2. Conveniently, bearings 19 comprising rolling body circulation are interposed between said tracks. An actuator 22 arranged to apply a predetermined force to the slide 13 in the direction of the Y axis conveniently comprises a hydraulic cylinder, the rod 23 of which is connected to the slide. The apparatus also comprises a rod 24 connected to the plate 3a of the articulated element 3, said plate rotating about the Z axis under the action of an actuator 25 which applies a torque of predetermined value to said rod. Consequently, as can be clearly seen in FIG. 2, said rod is housed within an axial bore in the connection member 6, its lower end projecting from said member. The actuator 25 (FIG. 2) consists conveniently of a hydraulic cylinder fixed to the slide 13 and provided with an axially mobile rod 26 to which there is connected a rack 27 engaging with a toothed sector 28 rigid with a rotatable ring 29. Ring 29 is fixed onto a seat on the slide 13 by way of a ring of rolling bodies 30. A coupling indicated overall by 31 is arranged to transmit rotation from the ring 29 to the lower end of the rod 24 to enable the rod to translate axially in the direction of the Z axis. This coupling comprises at least one pair of connecting links 32 hinged together. One of links 32 is hinged to the rotatable ring 29 and the other link 32 to an arm 33 rigid with the rod 24 in such a manner as to form a compass. The coupling conveniently comprises two pairs of such connecting links.

Figure 3:
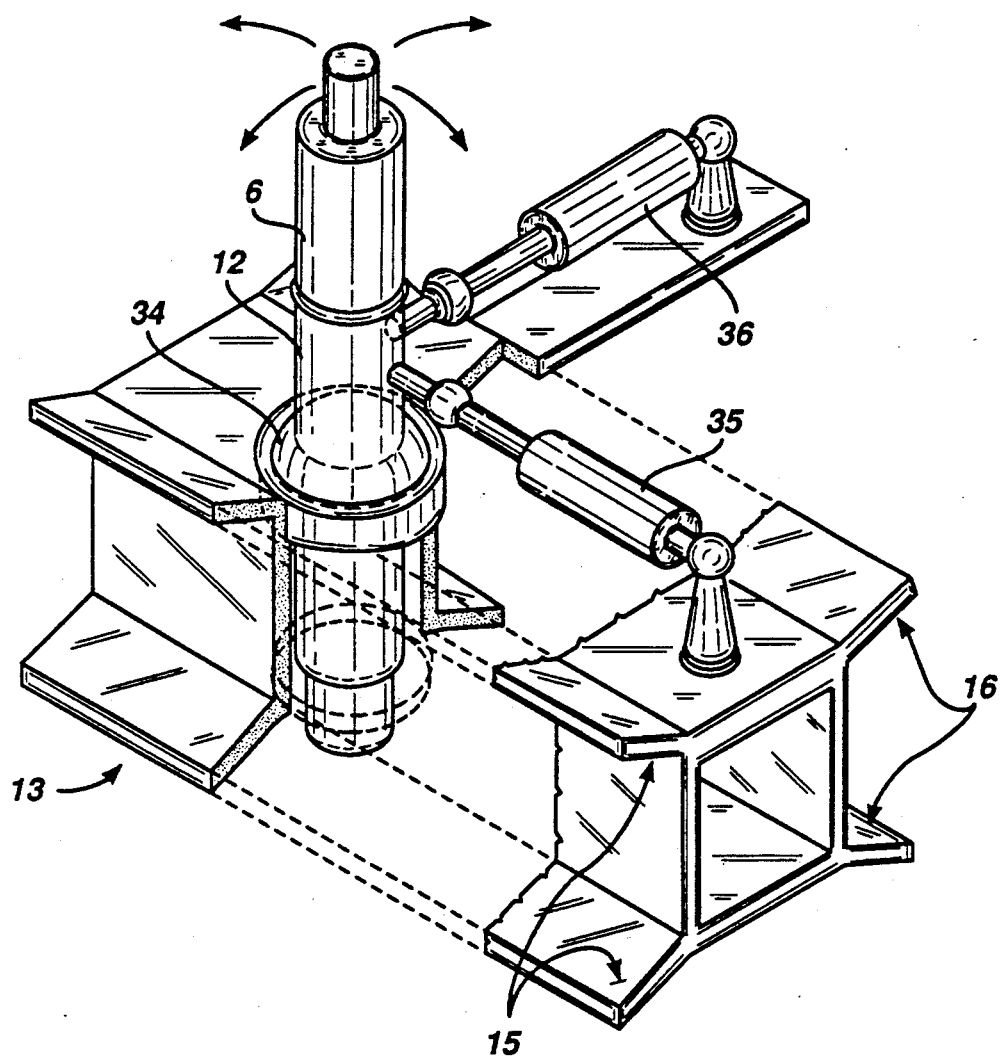
FIG. 3 is a perspective representation of some parts of the apparatus corresponding to a slightly different embodiment from the preceding.

In the embodiment shown in FIG. 3, the sleeve 12 oscillates about the slide 13, being hinged to slide 13 by a ball joint 34. In addition, two actuators 35 and 36 with mutually orthogonal axes are arranged to apply predetermined forces to the sleeve 12 to cause it to oscillate about axes passing through the center of the joint 34. Said actuators are conveniently in the form of hydraulic cylinders, the casing and rod of which are hinged to the slide 13 and sleeve 12 respectively.

It is apparent that although the apparatus of the invention prevents the vehicle undergoing forward movement, it preserves all the degrees of freedom of movement necessary to reproduce real vehicle running conditions. In this respect all suspension movements (roll, pitch and translation in a direction orthogonal to the support plane) are preserved. Roll motion (virtual rotation about the X axis) is allowed as a consequence of the relative oscillation of the articulated element 1 about said axis, enabled by the cylindrical guides 7. The pitch motion (oscillation about the Y axis) is obtained by the virtual oscillation of the articulated element 2 about said axis, enabled by the presence of the cylindrical guides 8. The vertical translational motion in the direction of the Z axis is enabled by the coupling between the connection member 6 and the sleeve 12. The apparatus also preserves the degree of freedom of movement necessary to reproduce the attitude motion (transverse movement and yaw). Motion in the transverse direction (in the direction of the Y axis) is enabled by the slide 13 which moves transversely on the guides 14, and yaw motion is enabled by the rotation of the connection member 6 about the Z axis by virtue of the type of coupling between said member 6 and the sleeve 12.

The apparatus of the invention also enables certain actions which the vehicle undergoes under certain running conditions to be simulated, such as centrifugal force action, lateral wind action, and the action of a wind oblique to the running direction which tends to rotate the vehicle about a vertical axis. In this respect, by means of the actuator 22, it is possible to apply to the slide 13 a force of predetermined value in the direction of the Y axis and thus in a direction normal to the running direction, which can simulate the action of the centrifugal force on the vehicle along a curve or the action of the wind on the vehicle. In addition, by means of the actuator 25 it is possible to apply a torque of predetermined value to the rod 24 to generate a yaw moment which could simulate the effect of a wind oblique to the running direction. By means of the coupling formed by the rack 27 (FIG. 2) and toothed sector 28, the actuator 25 is able to rotate the ring 29, which by way of the coupling 31 transmits rotation to the rod 24. The coupling 31 allows correct transmission of this moment, even if the vehicle undergoes movement in the direction of the Z axis. The two pairs of connecting links 32 which connect the ring 29 to the arm 33 allow the rod 24 and slide 13 to undergo relative axial movements. Finally, with the embodiment of FIG. 3 it is also possible to induce, by means of the actuator 35, a rotation about an axis parallel to the X axis, and by means of the actuator 36, a rotation about an axis parallel to the Y axis, thus tending to cause the sleeve 12 to oscillate about axes passing through the center of the coupling 34.

The assembly of dynamometer cells 9 allows the components of the forces transferred between the plates 3a and 3b, forming part of the third articulated element 3, to be measured. It is apparent that because of the small dimensions, the shape and arrangement of the members and parts of the apparatus, there is no generation of forces or moments of inertia during its operation which are of such an extent as to negatively influence the measurements or the vehicle motion. In addition, as the apparatus is positioned totally below the vehicle, this latter remains completely accessible from all sides. Again, the operations required to connect the vehicle to the apparatus are simple and rapid, it being necessary only to fix the end of the articulated element 1 to the longitudinal members 4.

It is apparent that modifications can be made to the invention in terms of both the shape and arrangement of the various parts, but without leaving the scope of the inventive idea.

I claim:

1. A motor vehicle constraining apparatus, particularly suitable for vehicle running simulation benches, comprising:
   a first rigid element, a second rigid element and a third rigid element joined articulately together by constraint structure to allow the first element to oscillate with respect to the second element about a first substantially fixed axis of virtual oscillation, and to allow the second element to oscillate with respect to the third element about a second substantially fixed axis of virtual oscillation perpendicular to the first axis, the first element being rigidly attached to a vehicle body and the third element being fixed to a support structure interposed between the apparatus and an apparatus base;
   wherein the constraint structure comprises a first series of substantially cylindrical guides interposed between the first element and the second element and a second series of substantially cylindrical guides interposed between the second element and the third element and;
   wherein the third element comprises a pair of plates;
   said apparatus further comprising an assembly of dynamometer cells disposed between said pair of plates and arranged to measure the force components transferred between said plates, said assembly of dynamometer cells comprising four cells disposed such that central elongation axes of said cells form a pyramid configuration.

2. An apparatus as claimed in claim 1, wherein said support structure comprises a rigid connection member arranged to rigidly connect said third element to a floor.

3. An apparatus as claimed in claim 1, wherein said support structure comprises a connection member fixed to said third element and mobile axially in the direction of a third axis perpendicular to said first axis and said second axis.

4. An apparatus as claimed in claim 1, wherein said support structure comprises a connection member fixed to said third element and rotatable about a third axis perpendicular to said first axis and said second axis.

5. An apparatus as claimed in claim 1, wherein said support structure comprises a connection member fixed to said third element, mobile in the direction of a third axis perpendicular to said first axis and said second axis and rotatable about said third axis within a sleeve connected to a slide mobile in the direction of said second axis.

6. An apparatus as claimed in claim 1, further comprising an actuator arranged to apply a predetermined force to said slide in the direction of said second axis.

7. An apparatus as claimed in claim 1, further comprising a first rod connected to one of said plates of said third element and rotatable about said third axis under the action of an actuator arranged to apply a torque of predetermined value to said first rod.

8. An apparatus as claimed in claim 1, wherein said second element includes a first pair of substantially coaxial arms to which said first series of guides are fixed, and a second pair of substantially coaxial arms perpendicular to said first pair of arms to which said second series of guides are fixed, said first element comprising a beam to which said vehicle body can be attached and to which said first series of guides are fixed.

9. An apparatus as claimed in claim 8, wherein said first and second series of guides comprise shoes with rolling body circulation.

10. An apparatus as claimed in claim 6, further comprising a pair of slide guides to support said slide, said slide being provided with a first pair of slide tracks arranged to cooperate with a first pair of corresponding guide tracks of one of said slide guides and with a second pair of slide tracks arranged to cooperate with a second pair of corresponding guide tracks of the other of said slide guides, bearings with rolling body circulation being interposed between said guide tracks and slide tracks.

11. An apparatus as claimed in claim 7, wherein said actuator comprises a hydraulic cylinder operatively connected to a second rod, said second rod fixed to a rack, said rack engaging a toothed sector, said sector connected to a ring rotatable on said slide and to a coupling arranged to transmit rotation from said ring to said first rod to allow axial translation of said first rod.

12. An apparatus as claimed in claim 11, wherein said coupling comprises at least one pair of hinged connecting links, a first of said connecting links being hinged to said ring and a second of said connecting links being hinged to an arm rigid with said first rod.

13. An apparatus as claimed in claim 5, further comprising a first actuator having a first actuator axis, said first actuator being arranged to apply predetermined forces to said sleeve, thereby causing said sleeve to oscillate about an axis parallel to said first fixed axis;
   a second actuator having a second actuator axis, said first actuator axis being perpendicular to said second actuator axis, said second actuator being arranged to apply predetermined forces to said sleeve, thereby causing said sleeve to oscillate about an axis parallel to said second fixed axis; and
   a ball joint having a center on an elongation axis of said sleeve, said ball joint being connected to said sleeve and enabling said sleeve to pivotally mount to said slide.

* * * * *